(12) United States Patent
O'Brien

(10) Patent No.: US 7,648,660 B2
(45) Date of Patent: Jan. 19, 2010

(54) CONTINUOUS COATING PROCESS FOR COMPOSITE MEMBRANES

(75) Inventor: William George O'Brien, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 420 days.

(21) Appl. No.: 11/384,768

(22) Filed: Mar. 20, 2006

(65) Prior Publication Data

US 2006/0214325 A1   Sep. 28, 2006

Related U.S. Application Data

(60) Provisional application No. 60/665,066, filed on Mar. 24, 2005.

(51) Int. Cl.
*B32B 33/00* (2006.01)
(52) U.S. Cl. .............................. 264/172.19; 264/173.11
(58) Field of Classification Search ............ 264/172.19, 264/173.11
See application file for complete search history.

(56) References Cited

U.S. PATENT DOCUMENTS

| 3,953,566 | A |   | 4/1976  | Gore              |       |
|-----------|---|---|---------|-------------------|-------|
| 3,962,153 | A |   | 6/1976  | Gore              |       |
| 5,051,114 | A | * | 9/1991  | Nemser et al. ..... | 95/47 |
| 5,082,472 | A |   | 1/1992  | Mallouk et al.    |       |
| 5,593,794 | A | * | 1/1997  | Wei et al. ........ | 429/91|
| 5,663,255 | A |   | 9/1997  | Anolick et al.    |       |
| 6,110,333 | A |   | 8/2000  | Spethmann et al.  |       |
| 6,130,175 | A |   | 10/2000 | Rusch et al.      |       |
| 6,406,517 | B1| * | 6/2002  | Avery et al. ..... | 95/45 |
| 2004/0000231 | A1 | * | 1/2004 | Bikson et al. .... | 95/45 |

FOREIGN PATENT DOCUMENTS

EP   0 203 577 A2   12/1986

* cited by examiner

*Primary Examiner*—Kat Wyrozebski
*Assistant Examiner*—Robert J Grun

(57) ABSTRACT

A continuous process for coating ePTFE with polymer wherein a first coating of fluoropolymer-containing liquid medium is formed on a moving elongate substrate, elongate ePTFE is contacted with the coated substrate to form an inchoate composite structure, and a final coating of fluoropolymer-containing liquid medium is formed on the inchoate composite structure.

22 Claims, 3 Drawing Sheets

1 = 11.6 μm, #2 = 16.9 μm, #3 = 8.1 μm
Σ = 36.6 μm (1.44 mil)

1 = 17.8 μm, #2 = 11.3 μm, #3 = 13.8 μm
Σ = 42.9 μm (1.69 mil)

1 – 14.4 μm, #2 = 10.0 μm, #3 = 11.0 μm, #4 – 10.6 μm, #5 – 10.6 μm
Σ = 42.9 μm (1.69 mil)

US 7,648,660 B2

CONTINUOUS COATING PROCESS FOR COMPOSITE MEMBRANES

FIELD OF THE INVENTION

This invention relates to the continuous coating of expanded polytetrafluoroethylene to make composite membranes.

BACKGROUND OF THE INVENTION

Nonporous membranes are barriers to flow, but are selectively permeable to certain species by diffusion. For example, a membrane separating two different fluids prevents gross or indiscriminate mixing of the fluids, but may permit preferential passage of one or more components of the fluids. Flux is a measure of the rate of passage, and selectivity is a measure of the discrimination shown by the membrane toward the various species that can pass through it. Certain polymers are used in membranes for gas separation, and in electrochemical applications such as fuel cells and electrolysis. In the latter case the polymers are ionomers, i.e., polymers with ion-exchange capacity.

Membranes may be in the form of polymer films, in which case they must have, in addition to properties suitable for acting as a barrier and for transport, sufficient strength to resist tearing or puncturing, or excessive stretching such as would be caused by differential pressure across the membrane. Alternatively, composite membranes are used in which the polymer is supported on a reinforcing substrate. In composites, no more polymer need be used than necessary for effective barrier and transport properties. Improved strength is provided by the reinforcement. Examples of reinforcing materials are woven or nonwoven fabric, or expanded polytetrafluoroethylene (ePTFE, available commercially, for example as Tetratex® or Goretex®).

In many application it is desirable that the composite membrane be thin, often on the order of micrometers. Such thin membranes can be made by coating ePTFE. A plurality of coats may be applied, often to both sides of the ePTFE. This can be done by spraying or dipping, but a continuous process would be preferred if uniform impregnation and uniform thickness could be assured without damage to the ePTFE, especially for thin, and therefore, fragile ePTFE and resulting composite membranes.

An improved process is needed for coating of ePTFE to make composite membranes.

SUMMARY OF THE INVENTION

The present invention provides a process for manufacturing a composite membrane comprising:

continuously forming a first coating of fluoropolymer-containing liquid medium onto a moving elongate casting substrate, said coating having a selected thickness;

continuously contacting elongate ePTFE with said coating on said moving casting substrate to form an inchoate composite structure on said substrate, said thickness of said first coating being selected to at least partially impregnate said ePTFE and form a layer of fluoropolymer-containing liquid medium which, upon drying, forms a layer of fluoropolymer in contact with said substrate and said ePTFE film;

continuously forming a final coating of fluoropolymer-containing liquid medium on said inchoate composite structure on said moving elongate casting substrate, said final coating having a selected thickness and forming on said inchoate composite structure a layer of fluoropolymer-containing liquid medium which, upon drying, forms a layer of fluoropolymer on said ePTFE;

drying said inchoate composite structure;

removing said casting substrate.

DETAILED DESCRIPTION

Figure 1:
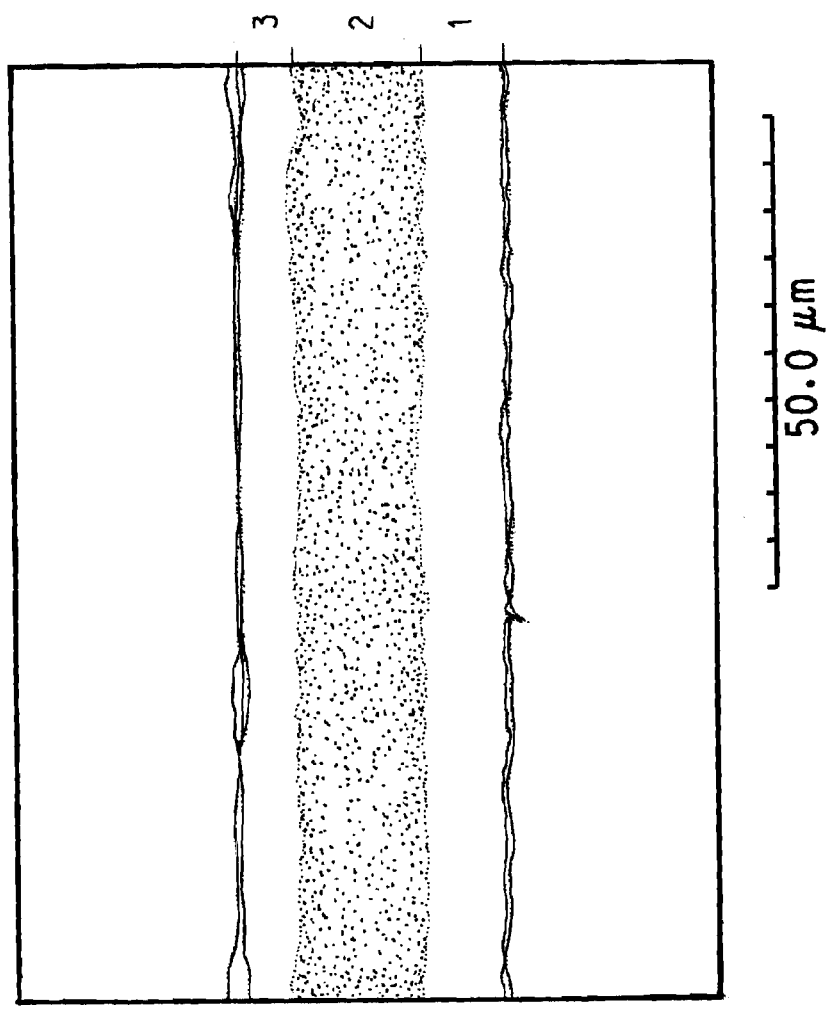
FIG. 1 is a photograph obtained by scanning electron microscopy (SEM) of the cross-section of a composite membrane made according to this invention.

Expanded polytetrafluoroethylene (ePTFE) for use in accordance with the invention is available commercially as Tetratex® (Donaldson Co. Minneapolis Minn. USA) or as Goretex® (W.L. Gore Associates, Elkton Md. USA). ePTFE may also be obtained from Yeu Ming Tai Chemical Industrial Co. Ltd., Taichung, Taiwan. It can be made according to the methods described in U.S. Pat. Nos. 3,953,566 and 3,962,153. Thicknesses range from about 2 µm to 200 µm before processing (initial thickness). The porosity (initial pore size) preferably is about 0.1 µm to about 10 µm, more preferably, about 0.2 to about 0.5 µm. Porosity may be measured from scanning electron micrographs (SEM) of ePTFE by taking the mean of the diameter of a reasonable number of representative pores, preferably about 10 to 25.

The process of the invention is useful for coating ePTFE film with a variety of fluoropolymers to make various types of composite membranes. Composite membranes useful for electrochemical cells such as chloralkali electrolyzers or fuel cells, can be made by coating ePTFE with fluoropolymer which is fluorinated ion-exchange polymer known in the electrochemical art. Preferred is perfluorinated ion-exchange polymer having sulfonic acid or carboxylic acid groups and most preferably is perfluorinated ion exchange resin having sulfonic acid groups, such as that sold under the trademark Nafion®. Suitable perfluorinated ion exchange resin with sulfonic acid groups in dispersion form is available as Nafion® solution, from Aldrich Chemical Co., Milwaukee Wis. USA, and the DuPont Company, Wilmington Del., USA. The equivalent weight (EW) (grams of polymer in the hydrogen ion (proton) form that will neutralize one equivalent of sodium hydroxide) of suitable perfluorinated ion exchange resin is about 800-1300, preferably about 850-1200, more preferably about 850-1100, most preferably about 850 to 950.

The fluoropolymer-containing liquid media used in the coating process of this invention preferably have a solids content of about 1 to about 20 wt %. For use in making composite membranes in accordance with the invention for use in electrochemical cells, the ion-exchange polymer is preferably about 5-20 wt % of the solution (solids content, wt %), more preferably about 7 to 15 wt %, most preferably about 10 to 15 wt %. The viscosity of the solution is preferably in the range of about 50 to 200 mPa·s, more preferably about 50 to 80 mPa·s.

The solution of perfluorinated ion-exchange polymer preferably contains less than about 10 wt % water, more preferably less than about 5 wt %, even more preferably less than about 4 wt %, and most preferably water is in the range of about 2.5 wt % to about 0.5 wt %. If water content less than about 1 wt % is desired and is being done by a thermal process such as solvent displacement on a rotary evaporator, it is preferred to keep the temperature of the solution below about 30-35° C. so as to avoid color formation in the solution. The alcoholic component of the solution preferably should have a boiling point at least about that of n-butanol and not greater than about that of n-octanol. Preferably the alcoholic component should be selected from the butanols, pentanols, and hexanols, including mixtures of these, the choice being made to accommodate coating line speeds and drying conditions, including humidity. Glycerin, or glycols, preferably ethylene glycol, may be added to control drying rate. Glycol should not exceed about 20 wt % of the total alcohol content, preferably no more than about 15 wt %, more preferably no more than about 10 wt %, most preferably no more than about 5 wt %. Excessive glycol can result in a sticky composite, difficult to separate from substrate or otherwise handle. All weight percents are based on the combined weights of solvent(s) and polymer.

For making composite membranes useful in gas separations, fluoropolymers suitable for use in selectively permeable membranes, and more preferably amorphous fluoropolymers, and most preferably ring-containing amorphous fluoropolymers, are used. Preferably, the polymers are used in solution form. An example of amorphous fluoropolymer is a copolymer of tetrafluoroethylene (TFE) and hexafluoropropylene (HFP) that is 50 wt % HFP. This polymer is soluble in a variety of fluorocarbon solvents such as FC40 (Fluorinert electronic liquid sold by 3M Industrial Chemicals Division (St. Paul Minn. USA), thought to be substantially perfluoro (tributylamine)), perfluorohexane, or perfluorooctane. The polymer and its solutions are disclosed in U.S. Pat. No. 5,663, 255, Examples 53 and 57. Examples of ring-containing amorphous fluoropolymers include Teflon® AF polymers (DuPont Company, Wilmington Del. USA), such as Teflon® AF 1600S2, a solution in FC40 of copolymer of TFE and perfluoro-2,2-dimethyl-1,3-dioxole (PDD) having an glass transition temperature (Tg) of 160° C. The preferred viscosity for Teflon® AF solutions is about 5 to 1000 mPa·s. Solutions in this viscosity range typically have about 1.5 to 12 wt % solids.

Although the term "solution" is sometimes used in describing fluoropolymers in liquid medium, it is recognized that it is not always possible to distinguish polymer molecules in solution from polymer micelles in solution in the case of perfluorinated ion exchange polymers. Also, it is not necessary for the process according to this invention that the polymer be in solution. A dispersion or emulsion can be used if the polymer forms a film, that is, coalesces, under the drying conditions or by further heating thereafter. "Fluoropolymer-containing liquid medium" as used in this application refers to fluoropolymer coating liquids for use in the process and includes solutions, micelles, and dispersions and emulsions.

Continuous coating according to this invention is at least a two-step coating process. In the preferred form of the invention described in the following, the process is carried out in exactly two coating steps. Although more than two coating steps can be performed as is also noted in the following and there is no intent to limit the invention to a two coating process, the preferred process with two coating steps can manufacture with high efficiency composite membranes with desirable properties. Of the at least two coating steps, the first coating step, and the first coating, are so called, and the last coating step, and the last coating, are called the final coating step, and the final coating.

In the process, the first step is the application of a first coating of the fluoropolymer-containing liquid medium to a moving elongate substrate. The substrate may be any material that does not significantly absorb the fluoropolymer-containing liquid medium, and on which the fluoropolymer-containing liquid medium neither beads up nor spreads significantly beyond the width at which the fluoropolymer-containing liquid medium is laid down. A preferred substrate is polyester film having a smooth surface and a thickness of about 2 to about 10 mils (50 to 250 µm), preferably about 4 to about 6 mils (100 to 150 µm), such as the 5 mil (125 µm) film sold under the trademark Mylar® by DuPont Teijin Films. Mylar® 500A film is a preferred grade. If it is found after coating that the composite membrane is not easily removed from the substrate, Mylar® 200D film is a more preferred grade because it has a smoother surface with better release. For still better release, Mylar® films is available with silicone surface treatment. Silicone-treated substrate generally should not be used if the coating is perfluorinated ion exchange polymer, which tends to stick to such substrates.

The substrate is coated with fluoropolymer-containing liquid medium by any suitable means such as a coating die fed by a metering pump. The thickness of the fluoropolymer-containing liquid medium applied to the substrate is determined by the amount of polymer that is to be applied to the ePTFE. For example, to obtain a composite membrane about 1.25× the thickness of the ePTFE starting material, the total thickness of the wet layers applied should be about 10× as thick as the ePTFE starting material if the fluoropolymer-containing liquid medium is about 13% solids, i.e. polymer content. Example 1 shows this.

The ePTFE is brought in contact with the substrate coated with the wet first coating such as by supplying from ePTFE roll stock, the ePTFE roll suitably unwinding onto the substrate without being driven. This can be performed at any practical distance from the first coating station, e.g., approximately 200 cm. In the preferred process, the ePTFE is drawn down on and adheres to the wet substrate by the wetting forces of the fluoropolymer-containing liquid medium and forms an inchoate composite membrane. ePTFE having one or more coatings prior to process completion is referred to herein as an inchoate composite structure, so-called because it is not yet a completely finished composite membrane.

Line speed is preferably in the range of 1 to 50 feet/min (0.3-15 m/min) more preferably 2-25 feet/min (0.6-7.5 m/min), and most preferably 5-10 feet/minute (1.5-3 m/min).

The thickness of the first coating is selected to at least partially impregnate the ePTFE and to form a layer of fluoropolymer-containing liquid medium which, upon drying, forms a layer of fluoropolymer in contact with the substrate and the ePTFE. The maximum thickness of the wet coating on the substrate is limited by the tendency of the coating to flow out laterally toward the edges of the substrate. The tendency to flow is a function of the viscosity of the fluoropolymer-containing liquid medium, so more viscous solutions can be coated more thickly. However, viscosity should not be so high as to retard or prevent absorption of the fluoropolymer-containing liquid medium into the ePTFE, a function of ePTFE pore size, larger pores being able to absorb more viscous solutions more rapidly. The thickness of the fluoropolymer layer in contact with the substrate and the ePTFE provided by the first coating after drying is preferably in the range of about 0.5 µm to 50 µm. Preferably, this layer is continuous.

In the preferred form of the process of the invention, the substrate plus inchoate composite structure with the first coating passes through a three zone hot air convection oven. The oven is long enough to permit about 1-3 minutes residence time for the film in each zone. Especially for ion exchange polymers, which have polar and at least in part, higher boiling solvents it is preferred that the second zone be at a higher temperature than the first, and that the third be higher than the second, for a good quality coating. For amorphous nonionomeric fluoropolymers, such as Teflon® AF, in solvents like perfluorohexane, a single temperature, relatively low (e.g. 30° C.-60° C.) compared to that used with fluorinated ion exchange polymers, may be used. The choice of temperatures depends upon the solvent(s) in the fluoropolymer-containing liquid medium. The temperature should not be so high as to affect the substrate. For example, Mylar® 500A should not be heated above about 100° C. The drying at a minimum should be sufficient to bring the inchoate composite structure to a state suitable for the subsequent steps of the process of this invention. It need not be "complete drying" or "optimum drying", that is, drying to the state necessary for the composite membrane of this invention to be of use in its intended application. Such complete or optimum drying may be deferred until all coating steps have been finished.

For perfluorinated ion-exchange polymer in aqueous alcoholic medium it is found that preferred temperatures are: first zone about 40° C., second zone about 60°, and third zone about 90° C. The air flow in the oven is sufficient to ensure that in the exhaust gas the organic vapor is below the lower explosive limit for the vapor.

After drying, the inchoate composite structure is preferably wound on a core to make a roll of inchoate composite structure. An interleaf, preferably of low density polyethylene (LDPE), may be used but is not generally necessary.

A second coating, which may be the final coating of fluoropolymer-containing liquid medium is then applied to the inchoate composite structure. The roll of inchoate composite structure is unwound and fluoropolymer-containing liquid medium is metered through the coating die onto the exposed surface of the inchoate composite structure to form a layer of fluoropolymer-containing liquid medium which, upon drying forms a layer of fluoropolymer on the ePTFE. If the ePTFE was not fully impregnated by the first coating, the second coating preferably also impregnates the ePTFE.

If a composite membrane containing more than one layer of ePTFE is desired, when the second coating, which in this case is not the final coating, is applied, another layer of ePTFE can be contacted with it and thereby added to the structure. The thickness of the fluoropolymer layer between layers of ePTFE will normally not need to be greater than necessary to adhere the ePTFE layers, i.e. it will be an adhesive layer. After the desired number of ePTFE layers have been added by repeating this step, the final coating of fluoropolymer-containing liquid medium is applied as described herein.

The final coating (and any intermediate coatings) need not be identical to the first in equivalent weight (if ionomeric) or in solvent or in chemical composition.

The choice of the thickness of the final coating will be determined by the application intended for the composite membrane. In the absence of reasons otherwise, it is preferred that the ePTFE be approximately centered between the unreinforced layers of polymer on the surface of the ePTFE, i.e., the thickness of the fluoropolymer layer in contact with the ePTFE and the substrate formed by the first coating is not greatly different from the thickness of the fluoropolymer layer on the ePTFE formed by the final coating. Preferably, the thickness of the first coating and said thickness of the final coating are selected to form a layers of fluoropolymer in contact with the ePTFE, the thicknesses of which are within a ratio of from about 20:80 to 80:20, more preferably from about 25:75 to 75:25, most more preferably from about 35:65 to 65:35, and most preferably from about 40:60 to 60:40.

Where the composite membrane contains more than one ePTFE component, it is preferred that the ePTFE components be disposed symmetrically in the composite membrane.

Preferably, the thickness of the fluoropolymer layer formed by the final coating is about 0.5 μm and about 50 μm. With the ePTFE approximately centered, there is less tendency for the composite membrane to curl with temperature changes, or, especially for fluorinated ion exchange polymer coatings, as moisture is absorbed or desorbed. It is preferred that the thickness of the final coating of fluoropolymer-containing liquid medium metered on the inchoate composite structure be about 25% to about 150% of the thickness of the fluoropolymer-containing liquid medium metered on in the first coating step. More preferably, the final coating thickness is about 35% to about 100%, most preferably about 50 to about 75% of the thickness of the first coating.

When the pores, including the surface pores of the ePTFE are substantially all filled with fluoropolymer, the ePTFE is said to be "fully impregnated" or "fully occluded".

If a surface fluoropolymer layer of greater than 50 μm thickness is desired between the substrate and the ePTFE in the inchoate composite structure, this can be done by first applying a coating of fluoropolymer-containing liquid medium to the substrate, drying the coating as described above, and then applying another coating to this already-coated substrate, and then contacting ePTFE with the coated substrate thereby forming an inchoate composite structure similar to that described above.

If a thicker, i.e. greater than about 50 μm, surface layer on the ePTFE is desired, a plurality of coatings may be applied by repeating the step for applying the final coating as described above.

Useful thicknesses of membranes made according to this invention are preferably not less than about 0.1 μm, more preferably not less than about 0.3 μm, still more preferably not less than about 1 μm, and preferably not more than about 250 μm, more preferably not more than about 150 μm, and still preferably not more than about 100 μm, and most preferably not more than about 40 μm. The application in which the composite membrane is to be used influences the preferred thickness. Usually membranes for electrolytic cells experience a more severe environment than membranes for gas separation, and therefore may be thicker, or may contain a thicker ePTFE layer.

In the course of coating and impregnation according to this invention, it is observed that the ePTFE becomes thinner than it was before coating. This reduction in thickness, or shrinkage, is believed to be caused by the reduction in volume that accompanies drying of the polymer coating which exerts a compressive force on the ePTFE. The degree of thinning is affected by the porosity of the ePTFE. More porous, lower density ePTFE tends to shrink (thin) more. Typically ePTFE will lose from about 25 to 75% of its thickness in the course of the formation of the composite membrane. Preferred thickness of the ePTFE in the composite membrane is about 0.3 μm to 40 μm.

Line speed for drying after the last coating step is from about the same as for the initial coating step to up to about 50% longer. The drying oven temperatures are about the same. When the inchoate composite structure (if further drying is to be done) or the composite membrane (if drying is complete) is wound up after drying, an interleaf, preferably low density polyethylene (LDPE), about 1 mil (25 μm) thick, should be used. The interleaf prevents blocking, i.e. interlayer sticking of composite to itself, in the case where the fluoropolymer has a low glass transition temperature (Tg) or is otherwise sticky or "grabby", or will be in storage for an extended time. Perfluorinated ion exchange resin applied to ePTFE gives a composite that tends to be sticky after coating. For non-sticky polymers, such as nonionomeric amorphous fluoropolymers, the interleaf is useful for keeping the composite clean in storage and handling before use.

For the some composite membranes in accordance with the invention such as those made with amorphous fluoropolymers, it is desirable for the membrane to wound up and stored in contact with the casting substrate and employing an interleaf if desired as discussed above. Just prior to use or at another convenient time, the substrate is separated from the composite membrane.

Perfluorinated ion exchange resin applied to ePTFE according to this invention generally has 2-20 wt % solvent remaining in the composite. The thicker the composite, the greater the amount of residual solvent. The solvent residue is principally higher alcohol(s) and glycol. It is preferred not to overdry the composite at this stage. Overdrying can cause wrinkling and crimping. To remove the residual solvent, the composite membrane on the substrate is preferably passed through a tank of water. When passed through the water, the composite membrane lifts off the substrate enabling the substrate to be easily removed. The composite is washed substantially free of residual solvents in the water tank. By substantially free is meant that after washing no more than about 1 wt % residual solvent remains in the composite membrane, preferably no more than about 0.5 wt %, more preferably no more than about 0.2 wt %, and most preferably no more than about 0.1 wt %. Emerging from the tank, the composite is wound up with an interleaf of absorbent material, such as Sontara® spunbonded polyester fabric. The composite is allowed to dry at ambient temperature with the Sontara® interleaf, which allows for dimensional changes during drying and maintains the planarity of the composite membrane. A day is ordinarily sufficient for drying. The composite membrane is stored on the roll with the Sontara® interleaf until it is to be used.

EXAMPLES

Commercial ePTFE is obtained from two sources:
1) Donaldson Company (Ivyland Pa. USA) as Tetratex® 3109. Thickness as determined before use from scanning electron micrographs (SEM) of the cross section and by micrometer, taking care not to crush the ePTFE, is 8 µm.
2) YMT (Yeu Ming Tai Chemical Industrial Co. Ltd., Taichung, Taiwan) as Style 2101. There is some variation among rolls of YMT Style 2101, so samples of ePTFE taken from each of the rolls used herein were measured:

| YMT Style 2101 | | | | |
|---|---|---|---|---|
| Roll Designation | Thickness (µm) | Density (g/cc) | Voids (%) | G# (sec) |
| B | 22.9 | 0.32 | 85 | 4.5 |
| D | 30.5 | 0.32 | 85 | 4.0 |
| II-B | 25.4 | 0.39 | 82 | 5.5 |

G#, also known as the "Gurley Number" is time for 100 cc of air to flow through 1 sq. in. (645 sq. mm) of ePTFE with a pressure differential of 5 in. water (1.25 kPa). Measurement is made using the Gurley® Densometer, Model No. 4110N, available from Gurley Precision Instruments, Troy N.Y. USA.

A commercial Nafion® dispersion, SE-10072, approximately 10% solids, about 9:1 water: alcohol solution is used. The equivalent weight of the perfluorinated ion-exchange polymer in SE-10072 is 990. Using a rotary evaporator, the aqueous alcohol solvent is replaced with n-butanol and ethylene glycol to make an 10.8 wt % solids solution of 90:10 butanol:glycol with 1.3 wt % residual water. Viscosity is 41 cps (41 mPa·s).

Teflon® AF 1601 is a commercially available (DuPont) amorphous fluoropolymer having a glass transition temperature (Tg) of 160° C. and is available as solid polymer or as a solution in fluorocarbon solvent. In the Example AF was dissolved in perfluorooctane (composition 85% perfluorooctane; 10% perfluorohexylethylene, 5% perfluorooctylethylene) to make a 3 wt % solution and a 6 wt % solution.

Example 1

Substrate is Mylar® 500A, width 13 in (33 cm). The die is set to deliver a 13 in (33 cm) wide coating. The Nafion® dispersion similar to that described above but having 13% solids, is coated. Line speed is 7 feet/min (213 cm/min). The three zones in the drying oven are set to 40° C., 60° C., and 90° C. respectively. ePTFE is Tetratex® 3109, described above.

The 13% solids solution is applied in two passes to 30 µm thick ePTFE according to the process of this invention. A gear pump supplies the solution at the rate of 2.92 cc/revolution. In the first pass, the pump is run at 40 rpm (40 rpm×2.92 cc/rev=117 cc/min). For the second pass (the final coating) the pump is run at 30 rpm (30 rpm×2.92 cc/rev=87.6 cc/min). A total of 204 cc/min is applied to the ePTFE.

The substrate is 13 in (33 cm) wide and advances at 7 ft/min (213 cm/min). Therefore the area coated is 33 cm×213 cm/min=7040 cm²/min. From this it is determined that the wet thickness of the combined applied layers is 204 cc/min÷7040 cm²/min=0.029 cm (290 µm).

The dried ePTFE composite is measured and found to have a total dry thickness of 37 µm. Therefore the composite thickness is about 25% thicker than the ePTFE starting material (30 µm). This achieved by applying a total wet coating thickness of 290 µm of 13% solids solution, a wet thickness about 10× the thickness of the starting ePTFE (30 µm). It will be apparent to the skilled artisan how to estimate coating thicknesses for ePTFE starting material of different thickness and fluoropolymer-containing liquid media of different solids content.

Example 2

Substrate is Mylar® 500A, width 13 in (0.33 m). The die is set to deliver a 12 in (0.30 m) coating. The Nafion® dispersion SE-10072 described above is coated. Line speed is 5 feet/min (1.5 m/min). The three zones in the drying oven are set to 40° C., 60° C., and 90° C. respectively. ePTFE is Tetratex® 3109, described above. A 138 µm wet coating of dispersion is applied from the die to the moving Mylar® substrate. ePTFE is applied to the wet substrate and the resulting first coating/ePTFE is dried and the dried first coating/ePTFE on the substrate is wound on a core. This is then moved to the unwind station of the coater and unwound sufficiently to allow the dried first coating/ePTFE on the substrate to be started on the coater. A second (final) coating of a 74 µm wet dispersion is coated on the moving (5 feet/min (1.5 m/min)) first coating/ePTFE film, which is then passed through the three zone drier at the above disclosed temperatures. As the resulting composite membrane on substrate emerges from the oven, and after cooling for a few minutes, the composite membrane is separated from the substrate and wound up with a 1 mil LDPE interleaf. Measurement shows that the ePTFE is centered in the composite membrane and the total thickness of the composite membrane is 25 μm.

Example 3

Example 2 is repeated except that, instead of separating the composite membrane from the substrate, the composite membrane on the substrate is passed through a container of water. The composite membrane separates from the substrate. The separated, washed composite membrane is dried with an air knife and wound up with an interleaf of Sontara®.

Example 4

Example 2 is repeated using the 3 wt % solids Teflon® AF 1600 solution in FC40 as the fluoropolymer in liquid medium. The three zones of the drying oven are all at 40° C. The ePTFE is found to be centered in the resulting composite membrane, which has a total thickness of 10 μm.

Example 5

YMT Style 2101 from Roll B is coated according to the general procedure of Example 2. The resulting composite membrane is cross-sectioned and the cross-section analyzed by scanning electron microscopy (SEM). The accelerating voltage is 15.0 kV. FIG. 1 shows the SEM of the cross-section. It is apparent that the ePTFE layer, visible by the difference in its texture and shading, is approximately centered in the membrane cross section.

From the scale on FIG. 1, the membrane thickness is determined to be 37 μm. The upper layer of perfluorinated ion-exchange polymer is 12 μm thick, the middle layer is impregnated ePTFE and is 17 μm thick, and the lower layer is perfluorinated ion-exchange polymer, 8 μm thick. The 12 μm thick upper polymer layer and 8 μm thick lower polymer layer are in a ratio of 12:8 (60:40) in thickness.

Example 6

Figure 2:
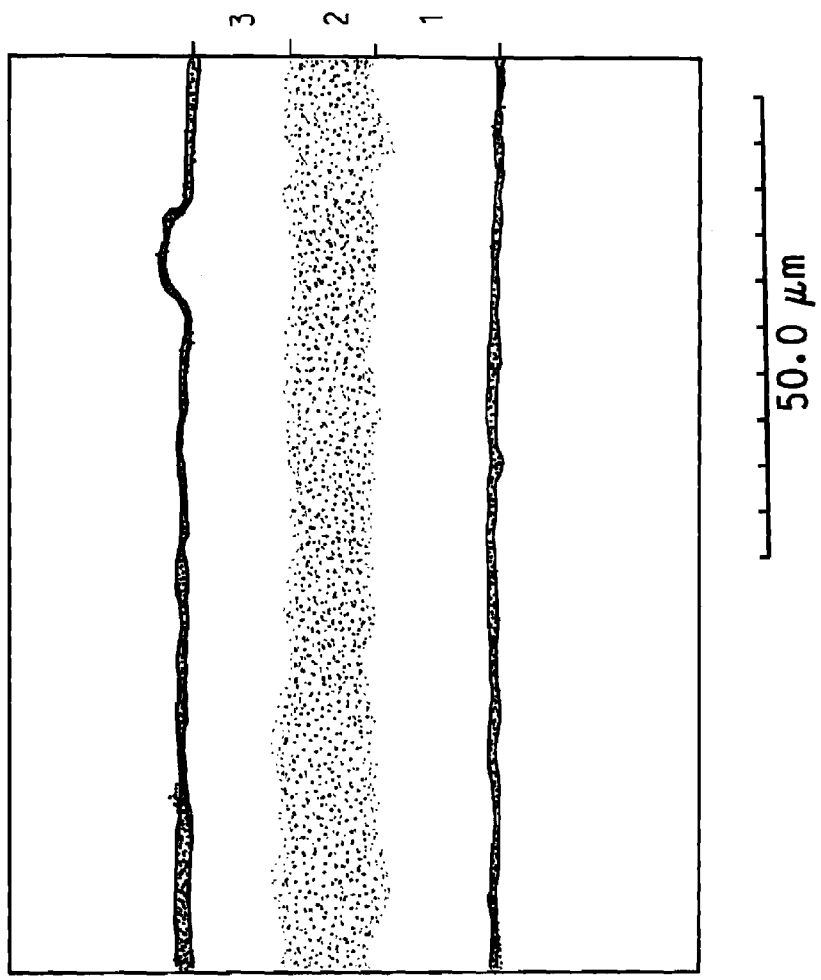
FIG. 2 is a photograph obtained by SEM of the cross-section of a second composite membrane made according to this invention.

YMT Style 2101 from Roll D is coated according to the general procedure of Example 2. The resulting composite membrane is cross-sectioned and the cross-section analyzed by scanning electron microscopy (SEM). The accelerating voltage is 15.0 kV. FIG. 2 shows the SEM of the cross-section. It is seen that the ePTFE is approximately centered in the membrane.

From the scale on FIG. 2, the membrane thickness is determined to be 43 μm. The upper layer of perfluorinated ion-exchange polymer is 18 μm thick, the middle layer is impregnated ePTFE and is 11 μm thick, and the lower layer is perfluorinated ion-exchange polymer, 14 μm thick. The 18 μm thick upper polymer layer and 11 μm thick lower polymer layer are in a ratio of 18:11 (62:38) in thickness.

Example 7

Figure 3:
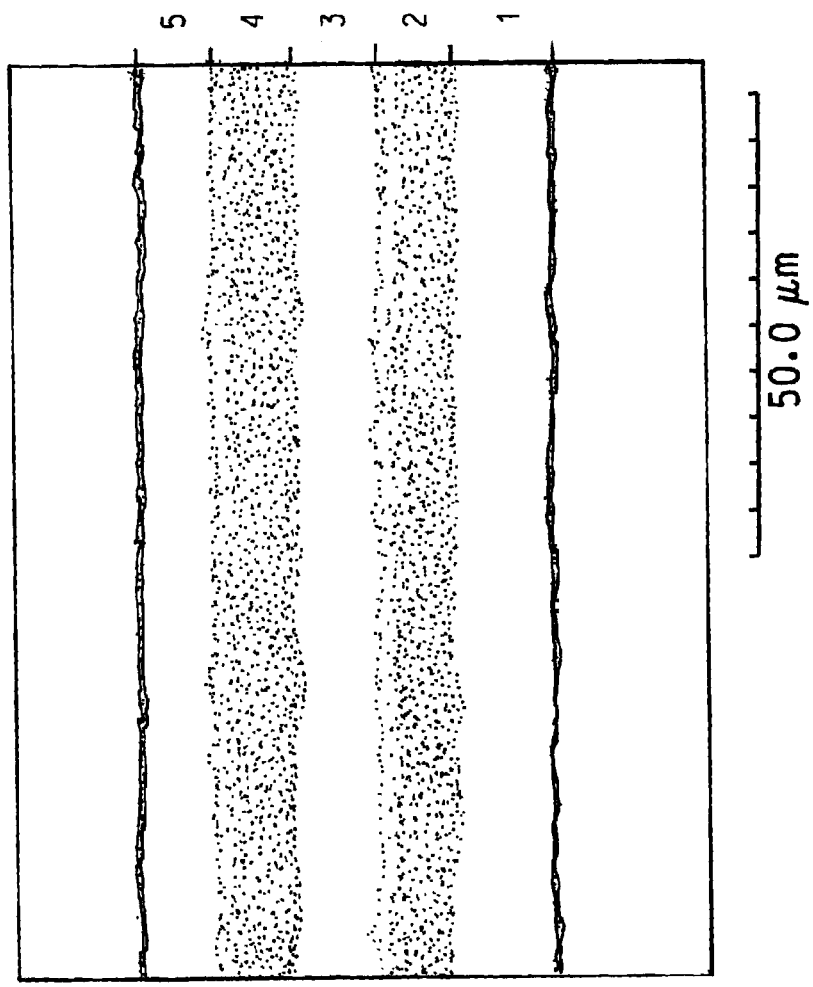
FIG. 3 is a photograph obtained by SEM of the cross-section of a composite membrane made according to this invention in which two layers of ePTFE are used.

YMT Style 2101 from Roll II-B is coated according to the general procedure of Example 2 except that when second coating is applied, another layer of ePTFE (Roll D) is contacted with it. This structure is then coated again in a third pass (the final coating) to give a membrane containing two layers of ePTFE. The resulting composite membrane is cross-sectioned and the cross-section analyzed by scanning electron microscopy (SEM). The accelerating voltage is 15.0 kV. FIG. 3 shows the SEM of the cross-section. It is seen that the ePTFE layers are nearly symmetrically located in the membrane. The polymer layer (interlayer) between the ePTFE layers is thicker than necessary if the objective were to adhere the ePTFE layers together. Such a thin adhesive layer however, would be less easily seen in an SEM cross-section. For the purposes of demonstration, a thicker interlayer is used in this example.

From the scale on FIG. 3, the membrane thickness is determined to be 58 μm. The upper layer of perfluorinated ion-exchange polymer is 14 μm thick, the upper layer of impregnated ePTFE is 12 μm thick, the central layer of perfluorinated ion-exchange polymer is 12 μm thick, the lower layer of impregnated ePTFE layer is 11 μm thick, and the lower layer of perfluorinated ion-exchange polymer is 11 μm thick. The 14 μm thick upper polymer layer and 11 μm thick lower polymer layer are in a ratio of 14:11 (56:44) in thickness.

What is claimed is:

1. A process for manufacturing a composite membrane comprising:

continuously forming a first coating of fluoropolymer-containing liquid medium onto a moving elongate casting substrate, said coating having a selected thickness;

continuously contacting elongate ePTFE with said coating on said moving casting substrate to form an inchoate composite structure on said substrate, said thickness of said first coating being selected to at least partially impregnate said ePTFE and form a layer of fluoropolymer-containing liquid medium which, upon drying, forms a layer of fluoropolymer in contact with said substrate and said ePTFE;

continuously forming a final coating of fluoropolymer-containing liquid medium on said inchoate composite structure on said moving elongate casting substrate, said final coating having a selected thickness and forming on said inchoate composite structure a layer of fluoropolymer-containing liquid medium which, upon drying, forms a layer of fluoropolymer on said ePTFE;

drying said inchoate composite structure; and removing said casting substrate.

2. The process of claim 1 wherein said thickness of said first coating and said thickness of said final coating are selected to fully impregnate said ePTFE with fluoropolymer.

3. The process of claim 2 wherein said thickness of said first coating and said thickness of said final coating are selected to form a layer of fluoropolymer in contact with said ePTFE and said substrate and a layer of fluoropolymer on said ePTFE wherein said layers are in a ratio of from about 20:80 to about 80:20.

4. The process of claim 2 wherein said thickness of said first coating and said thickness of said final coating are selected to form a layer of fluoropolymer in contact with said ePTFE and said substrate and a layer of fluoropolymer on said ePTFE wherein said layers are in a ratio of from about 25:75 to about 75:25.

5. The process of claim 2 wherein said thickness of said first coating and said thickness of said final coating are selected to form a layer of fluoropolymer in contact with said ePTFE and said substrate and a layer of fluoropolymer layer on said ePTFE wherein said layers are in a ratio of from about 35:65 to about 65:35.

6. The process of claim 1 wherein said fluoropolymer-containing liquid media of said first and final coatings have solids contents of about 1 to about 20 wt%.

7. The process of claim 1 wherein the solids content of said fluoropolymer-containing liquid medium of said first coating and the solids content of said fluoropolymer-containing liquid medium of said final coating are substantially equal and the thickness of said final coating is about 25% to about 150% of the thickness of said first coating.

8. The process of claim 1 wherein the solids content of said fluoropolymer-containing liquid medium of said first coating and the solids content of said fluoropolymer-containing liquid medium of said final coating are substantially equal and the thickness of said final coating is about 35% to about 100% of the thickness of said first coating.

9. The process of claim 1 wherein the thickness of said layer of fluoropolymer in contact with said ePTFE and said substrate is about 0.5 to about 50 μm.

10. The process of claim 1 wherein said ePTFE film has an initial thickness of about 2 to about 200 μm.

11. The process of claim 1 wherein said ePTFE film has an initial porosity of about 0.1 to about 10 μm.

12. The process of claim 1 wherein said ePTFE film in said composite membrane has a thickness of about 0.3 to about 40 μm.

13. The process of claim 1 further comprising heating said inchoate composite structure after said drying to coalesce said fluoropolymer.

14. The process of claim 1 wherein said drying of said inchoate composite structure comprises a first drying stage in which said inchoate composite structure is dried before forming said final coating of fluoropolymer-containing liquid medium.

15. The process of claim 14 further comprising winding up said inchoate composite structure after said first drying stage.

16. The process of claim 14 wherein said drying of said inchoate composite structure comprises a second drying stage after said forming said final coating of fluoropolymer-containing liquid medium.

17. The process of claim 1 wherein said fluoropolymer comprises fluorinated ion exchange polymer.

18. The process of claim 17 wherein said ion exchange polymer is perfluorinated.

19. The process of claim 18 wherein said ion exchange polymer is perfluorinated ion exchange polymer having sulfonic acid groups.

20. The process of claim 1 wherein said fluoropolymer comprises amorphous fluoropolymer.

21. The process of claim 20 wherein said fluoropolymer comprises ring-containing amorphous fluoropolymer.

22. The process of claim 21 wherein said fluoropolymer comprises a copolymer of tetrafluoroethylene and perfluoro-2,2-dimethyl-1,3-dioxole.

* * * * *

UNITED STATES PATENT AND TRADEMARK OFFICE
CERTIFICATE OF CORRECTION

PATENT NO. : 7,648,660 B2 Page 1 of 1
APPLICATION NO. : 11/384768
DATED : January 19, 2010
INVENTOR(S) : William George O'Brien It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this

Twenty-third Day of November, 2010

David J. Kappos
*Director of the United States Patent and Trademark Office*